(12) United States Patent
Sakib et al.

(10) Patent No.: US 11,086,985 B2
(45) Date of Patent: Aug. 10, 2021

(54) BINARY AUTHORIZATION BASED ON BOTH FILE AND PACKAGE ATTRIBUTES

(71) Applicant: Microsoft Technology Licensing, LLC, Redmond, WA (US)

(72) Inventors: Md. Nazmus Sakib, Seattle, WA (US); Thomas Walter Caldwell, III, Bellevue, WA (US); Jeffrey Sutherland, Seattle, WA (US); Deskin Miller, Redmond, WA (US); Scott Anderson, Seattle, WA (US); Deepak Jagannathan Manohar, Redmond, WA (US); Adrian Marinescu, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 362 days.

(21) Appl. No.: 15/831,006

(22) Filed: Dec. 4, 2017

(65) Prior Publication Data
US 2019/0171809 A1 Jun. 6, 2019

(51) Int. Cl.
*G06F 21/51* (2013.01)
*G06F 21/56* (2013.01)
(Continued)

(52) U.S. Cl.
CPC ............. *G06F 21/51* (2013.01); *G06F 9/445* (2013.01); *G06F 21/566* (2013.01); *G06F 8/61* (2013.01); *G06F 8/65* (2013.01); *G06F 2221/033* (2013.01)

(58) Field of Classification Search
CPC ........ G06F 21/51; G06F 9/445; G06F 21/566; G06F 8/61; G06F 8/65; G06F 2221/033; G06F 16/9024; G06F 21/64; G06F 16/901; G06F 16/27; G06F 16/273; H04N 21/8358; H04N 21/23892; G06T 1/0021; G06T 2201/0053; G06T 2201/0083; H04L 63/10; H04L 63/0428; H04L 9/3239; H04L 9/3226; G06N 3/02; G06N 5/022
See application file for complete search history.

(56) References Cited

U.S. PATENT DOCUMENTS

| 7,243,236 B1 * | 7/2007 | Sibert | ...................... G06F 21/51 380/255 |
| 8,484,739 B1 * | 7/2013 | Seshadri | ............. G06F 11/3006 709/224 |

(Continued)

OTHER PUBLICATIONS

Sutherland, et al., "Propagating Origin Information for Applications during Application Installation", Application as Filed in U.S. Appl. No. 15/288,586, filed Oct. 7, 2016, 48 Pages.

*Primary Examiner* — Meng Li
(74) *Attorney, Agent, or Firm* — Arent Fox LLP

(57) ABSTRACT

Examples described herein generally relate to a computer device including a memory, and at least one processor configured to determine whether to allow execution of an application file on the computer device. The processor receives a command to execute a file. The processor determines whether the file is associated with a package reputation of an installation package. The processor determines a file reputation of the file. The processor determines whether to allow execution of the file based on a combination of the file reputation of the file and whether the file is associated with the good package reputation.

18 Claims, 5 Drawing Sheets

|  |  | Package Reputation ||
|  |  | Good 312 | Not Good 314 |
| File Reputation | Trusted 322 | Allow | Allow |
|  | Unknown 324 | Allow | Block |
|  | Known Bad 326 | Block | Block |

(51) Int. Cl.
  *G06F 9/445* (2018.01)
  *G06F 8/65* (2018.01)
  *G06F 8/61* (2018.01)

(56) References Cited

U.S. PATENT DOCUMENTS

| | | | | |
|---|---|---|---|---|
| 8,661,547 | B1* | 2/2014 | Kononov | G06F 21/577 726/24 |
| 8,769,693 | B2* | 7/2014 | Pfeifer | G06F 21/57 726/22 |
| 8,950,007 | B1* | 2/2015 | Teal | G06F 21/57 726/30 |
| 9,311,481 | B1* | 4/2016 | Wawda | H04L 63/145 |
| 9,384,336 | B1* | 7/2016 | Ashley | G06F 21/30 |
| 9,385,869 | B1* | 7/2016 | Satish | G06F 21/64 |
| 10,089,469 | B1* | 10/2018 | Roundy | G06F 21/57 |
| 10,404,733 | B1* | 9/2019 | Shavell | H04L 63/1433 |
| 10,417,417 | B2* | 9/2019 | Kulkarni | G06F 21/56 |
| 2006/0080638 | A1* | 4/2006 | Fiore | G06F 8/71 717/104 |
| 2008/0141366 | A1* | 6/2008 | Cross | G06F 21/6218 726/21 |
| 2008/0163198 | A1* | 7/2008 | Rao | G06F 8/61 717/177 |
| 2008/0189326 | A1* | 8/2008 | Norrie | G06F 8/60 |
| 2009/0125692 | A1* | 5/2009 | Yamamoto | G06F 11/1451 711/162 |
| 2009/0172219 | A1* | 7/2009 | Mardiks | G06F 9/445 710/67 |
| 2013/0097660 | A1* | 4/2013 | Das | H04L 63/10 726/1 |
| 2013/0097710 | A1* | 4/2013 | Basavapatna | G06F 21/577 726/25 |
| 2013/0185799 | A1* | 7/2013 | Pfeifer | G06F 21/57 726/24 |
| 2015/0096018 | A1* | 4/2015 | Mircescu | G06F 21/51 726/23 |
| 2015/0172300 | A1* | 6/2015 | Cochenour | H04L 63/145 726/23 |
| 2016/0088011 | A1* | 3/2016 | Johri | H04L 63/1441 726/23 |
| 2016/0188878 | A1* | 6/2016 | Kulkarni | G06F 21/56 726/23 |
| 2016/0380977 | A1* | 12/2016 | Bean | H04L 63/1408 726/12 |
| 2017/0090929 | A1* | 3/2017 | Muttik | G06F 21/562 |
| 2017/0091482 | A1* | 3/2017 | Sarin | G06F 21/60 |

* cited by examiner

US 11,086,985 B2

BINARY AUTHORIZATION BASED ON BOTH FILE AND PACKAGE ATTRIBUTES

BACKGROUND

The present disclosure relates to cybersecurity, and more particularly to application control on computer devices.

Computer devices may be attacked by malicious code, which may include any executable code that an owner, administrator, or user of a computer device does not want to be executed on the computer device. For example, malicious code may include viruses, worms, and malware.

Application control is a technique for mitigating malicious code by limiting the applications that can be executed on a computer device. Application control is particularly effective for limited use systems where all applications needed for the system can be easily identified. An administrator may configure an application control list indicating allowed applications and blocking all other applications. Configuring an application control list for a computer device that may be used for multiple purposes may be a difficult and time consuming task for an administrator. In an enterprise environment, configuring application control for an enterprise including many computer devices used by different users with different needs increases the difficulty of configuring an application control list. Therefore, although application control is an effective defense against malicious code, application control has a low user acceptance rate.

Thus, there is a need in the art for improvements in application control for computer devices.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

In an example, the disclosure provides a computer device for authorizing execution of software. The computer device may include a memory and at least one processor communicatively coupled to the memory. The at least one processor may receive a command to execute a file. The at least one processor may determine whether the file is associated with a good package reputation of an installation package. The at least one processor may determine a file reputation of the file. The at least one processor may determine whether to allow execution of the file based on a combination of the file reputation of the file and whether the file is associated with the good package reputation.

In another example, the disclosure provides a method for rendering multiple content modules on a computer display. The method may include receiving a command to execute a file. The method may include determining whether the file is associated with a good package reputation of an installation package. The method may include determining a file reputation of the file. The method may include determining whether to allow execution of the file based on a combination of the file reputation of the file and whether the file is associated with the good package reputation.

In another example, the disclosure provides a computer-readable medium, storing code executable by one or more processors for determining whether to allow execution of an application file on a computer device. The computer-readable medium may include code for receiving a command to execute a file. The computer-readable medium may include code for determining whether the file is associated with a good package reputation of an installation package. The computer-readable medium may include code for determining a file reputation of the file. The computer-readable medium may include code for determining whether to allow execution of the file based on a combination of the file reputation of the file and whether the file is associated with the good package reputation.

Additional advantages and novel features relating to implementations of the present disclosure will be set forth in part in the description that follows, and in part will become more apparent to those skilled in the art upon examination of the following or upon learning by practice thereof.

DETAILED DESCRIPTION

Figure 1:
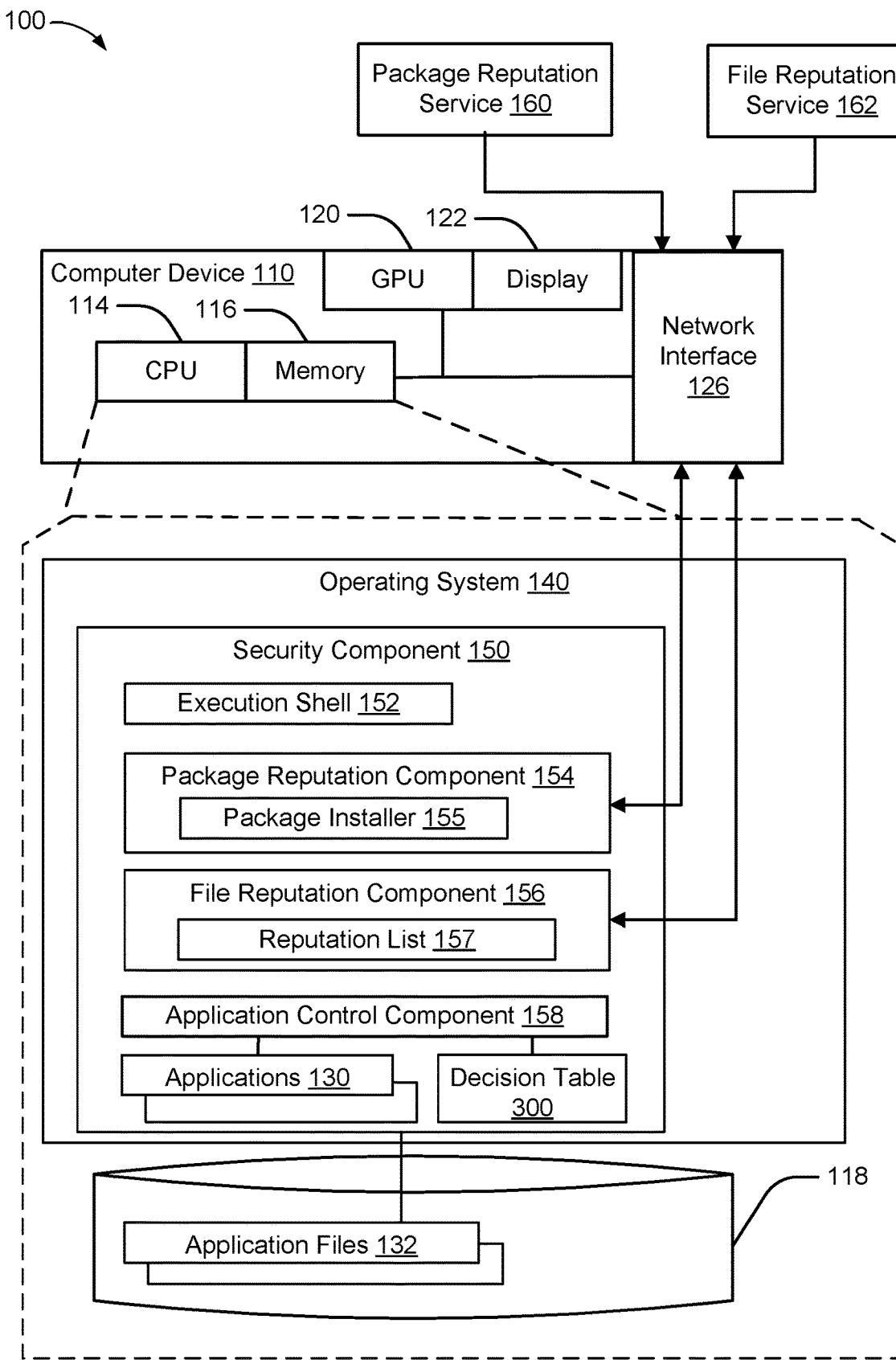
FIG. 1 is a diagram of an example computer system for determining whether to allow execution of application files on a computer device, in accordance with an implementation of the present disclosure.

The present disclosure provides systems and methods for application control on a computer device using binary authorization based on both file and package attributes. The methods disclosed herein may allow a security component, which may be part of an operating system or an independent security application, to perform application control using reputation of files and packages instead of a manually configured application control list.

Generally described, the security component may detect a command to execute an executable file, which may also be referred to as a binary. For example, the security component may detect a user command to execute an executable file or a call from an executing application to an executable file such as a dynamic linked library (DLL) file. The security component may perform authorization for every executable file to be executed. The authorization may include checking a first source for a reputation status of a package that installed the executable file and checking a second source for a reputation status of the individual file. The security component may determine whether to authorize the execution of the executable file based on both sources.

In an implementation, a first source may be a package reputation service. The package reputation source may provide a reputation status regarding installation packages used to install executable files for applications on a computer device. An installation package may be an executable file that installs one or more other executable files. For example, an installation package may have an .exe or .msi file extension. When an administrator or user executes an installation package to install files on the computer device, the security component may check the package reputation of the installation package. As the executable files are being installed, the security component may propagate an indication of the package reputation to each installed executable file. The security component may check the indication of the package reputation for each installed executable file in response to any command to execute the installed executable file. In an implementation, an executable file may be executed without being installed by an installation package. For example, an executable file may be downloaded or copied from removable media. An executable file that is not installed may not have an associated package reputation. Therefore, the executable file that is not installed may be treated as not being associated with a good package reputation.

Although a package reputation is useful for determining whether to allow execution of an executable file, there are some scenarios where package reputation alone may produce an undesired result. One example is a case of automatically updating executable files. Although the executable file may be initially installed via an installation package, the executable file may update itself or linked DLL files without a separate installation package. Accordingly, the indication of package reputation propagated to the installed executable files may not be associated with any updated executable files. If the security component were to rely solely on package reputation, the security component may prevent the updated executable file from executing. As another example, a reputation of a file installed by an installation package may change. For example, it is possible that an installation package includes a file that is later discovered to be malicious, either intentionally, or through a bug. Since the indication of package reputation is set for the installed file at the time of installation, if the security component were to rely solely on package reputation, the security component may allow execution of a file later identified as malicious.

The security component may use a file reputation in addition to a package reputation to determine whether to allow execution of a file. File reputation may be continually updated as information regarding files becomes available. For example, a positive reputation for updated executable files may be established as users install and use the updated executable file. In contrast, if bugs or malicious activity are detected related to a particular file, the reputation of the file may indicate such problems.

The security component may combine the package reputation and the file reputation in a manner that allows execution of the file when there is reason to believe the file is safe but blocks execution of the file when there is reason to believe the file has a problem. For example, when both the package reputation and file reputation agree that the file is a known good file, the executable file may be allowed to execute. In the case of an updated file, where the package reputation is unknown and therefore indicated as not good, the security component may allow the execution of the file if the file reputation indicates a known good file. Conversely, if the package reputation is not good and the file reputation is unknown, execution of the file may be blocked. When either the package reputation or the file reputation indicates that the file is a known bad file, execution of the package may be blocked.

Referring now to FIG. 1, an example computer system 100 includes a computer device 110. The computer device 110 may be, for example, any mobile or fixed computer device including but not limited to a desktop or laptop or tablet computer, a cellular telephone, a gaming device, a mixed reality or virtual reality device, a music device, a television, a navigation system, a camera, a personal digital assistant (PDA), a handheld device, any other computer device having wired and/or wireless connection capability with one or more other devices, or any other type of computerized device capable of installing and executing files.

The computer device 110 may include a central processing unit (CPU) 114 that executes instructions stored in memory 116. For example, the CPU 114 may execute an operating system 140 and one or more applications 130. The computer device 110 may also include a graphics processing unit (GPU) 120 for rendering an image for display on a display 122. For example, the display may present a user interface (UI) of the operating system 140 and/or the one or more applications 130.

The computer device 110 may include a display 120. The display 120 may be, for example, a computer monitor or a touch-screen. The display 120 may have a maximum display size. In an implementation, the display 120 may be subdivided into smaller portions. For example, a window may be a movable and resizable display area within the display 120. A window may have an adjustable display size.

Memory 116 may be configured for storing data and/or computer-executable instructions defining and/or associated with an operating system 140 and/or application 130, and CPU 114 may execute operating system 140 and/or application 130. Memory 116 may represent one or more hardware memory devices accessible to computer device 110. An example of memory 116 can include, but is not limited to, a type of memory usable by a computer, such as random access memory (RAM), read only memory (ROM), tapes, magnetic discs, optical discs, volatile memory, non-volatile memory, and any combination thereof. Memory 116 may store local versions of applications being executed by CPU 114. In an implementation, the memory 116 may include a storage device 118, which may be a non-volatile memory. The storage device 118 may store application files 132 corresponding to applications 130.

The CPU 114 may include one or more processors for executing instructions. An example of CPU 114 can include, but is not limited to, any processor specially programmed as described herein, including a controller, microcontroller, application specific integrated circuit (ASIC), field programmable gate array (FPGA), system on chip (SoC), or other programmable logic or state machine. The CPU 114 may include other processing components such as an arithmetic logic unit (ALU), registers, and a control unit. The CPU 114 may include multiple cores and may be able to process different sets of instructions and/or data concurrently using the multiple cores to execute multiple threads.

The operating system 140 may include instructions (such as applications 130) stored in memory 116 and executable by the CPU 114. The operating system 140 may include a security component 150 for determining whether to allow execution of an executable file. The security component 150 may apply to installation packages, installed executable files, and executable files that were not installed. In an implementation, the security component 150 is a component of the operating system 140 that may be utilized whenever a command to execute an application is received. In another implementation, the security component 150 may be an application executed by the CPU 114 when a command to execute another application is received. For example, the security component 150 may be implemented as an add-on security application. The security component 150 may include: a package reputation component 154 for determining a package reputation associated with an application file 132; a file reputation component 156 determining a file reputation of an individual file; and an application control component 158 for determining whether to allow execution of the application file 132 based on a combination of the package reputation and the file reputation.

The execution shell 152 may include computer executable instructions for detecting a command to execute an application file 132. The execution shell 152 may be, for example, a script host that detects commands to execute the application file 132. The execution shell 152 may also include additional commands for performing checks on the application file in response to the execution command. For example, the execution shell 152 may be responsible for triggering operation of the package reputation component 154, the file reputation component 156, and the application control component 158.

The package reputation component 154 may include computer executable instructions for determining whether a file is associated with a package reputation of an installation package. The package reputation component 154 may include a package installer 155. The package installer 155 may install application files 132 from an installation package to the storage device 118. An installation package may be an executable file including code for installing other executable files. The package installer 155 may determine a reputation of an installation package when installing the installation package. For example, the package installer 155 may contact a package reputation service 160 via the network interface 126. The package reputation service 160 may collect, analyze, and publish information regarding reputations of installation packages. The package installer 155 may allow or block execution of an installation package based on a reputation of the installation package. In an implementation, a user or administrator may be informed of a decision to block an installation package and may choose to override the block. For example, the user or administrator may agree to install an installation package that has an unknown package reputation. In another implementation, if the package reputation service 160 identifies a package as a known bad package, the package installer 155 may prevent execution of the installation package and installation of any files in the package. When the package installer 155 installs executable files, the package installer 155 may propagate the reputation of the installation package to each executable file. For example, the package installer 155 may tag each executable file with an indication of the package reputation. Accordingly, the package reputation component 154 may determine whether a good package reputation is associated with an installed file based on the indication without needing to contact the package reputation service 160.

In an implementation, the reputation of an installation package may be a binary status of either "good" or "not good." The reputation of the installation package may be received from the package reputation service 160, which may use various techniques to determine the reputation of the installation package. A good status may indicate that the installation package is known and considered safe. For example, a good status may indicate that the installation package includes files that perform as indicated and do not include malicious code or known security flaws. A "not good" status may indicate that the installation package does not meet one or more requirements for a good status. As discussed above, because the package installer 155 may not install a package with a reputation of "known bad," the package reputation for application files 132 installed on the storage device 118 may be limited to "good" and "not good." In an implementation, for example, an installation package publisher may need to inform the package reputation service 160 of the availability and features of the package. Notification from the publisher may result in a quick availability of a package reputation. The reputation of an installation package may change if, for example, new information such as hidden malicious code or a security flaw is discovered.

The file reputation component 156 may include computer executable code for determining a file reputation of the file. The file reputation component 156 may include a locally cached reputation list 157 for common files. The locally cached reputation list 157 may include identifiers of executable files (e.g., hashes) and a file reputation corresponding to each executable file. The locally cached reputation list 157 may be obtained from a file reputation service 162, which may be a cloud service, for example. The file reputation service 162 may collect, analyze, and publish information regarding reputations of individual executable files. The file reputation service 162 may take longer to develop a reputation of individual files than the package reputation service 160. For example, the file reputation service 162 may not receive information directly from a publisher of an executable file regarding the executable file. In an implementation, the file reputation service 162 may indicate one of three possible values for file reputation: "known good," "unknown," or "known bad." The file reputation service 162 may indicate "unknown" status when the file reputation service 162 does not have sufficient information regarding the file. For example, the executable file may have a limited circulation and may not have accumulated any reputation. The file reputation service 162 may indicate "known good" when the file has a reputation for being free of malicious code. For example, a known good status may be based on a relatively large number of computer devices having the file installed with a small number of reported errors associated with the file. A "known bad" status may indicate that the file is associated with a known problem such as malicious code or a security flaw. In an implementation, the package reputation service 160 may allow manual setting of a "known bad" status by a service provider when information regarding a file becomes known, for example, when a file is associated with a virus or malware.

The file reputation component 156 may use the locally cached reputation list 157 for common files to avoid a need for network communications when executing files. The locally cached reputation list 157 may use an identifier of the file to determine a reputation of the file. For example, the identifier may be a hash of the file. A hash may uniquely identify a file even if the file is renamed or metadata is changed. In an implementation, when the locally cached reputation list 157 does not include a reputation for a file to be executed, the file reputation component 156 may assign a temporary status of "unknown." Accordingly, because of the use of local information from the locally cached reputation list 157, the security component 150 may determine whether to execute the file without network connectivity. The file reputation component 156 may also query the file reputation service 162 regarding the file. The file reputation component 156 may store received query results in the locally cached reputation list 157. Accordingly, the file reputation may be available for a subsequent execution of the file.

The application control component 158 may include computer executable code for determining whether to allow execution of a file based on a combination of the package reputation and the file reputation. The application control component 158 may allow execution of the file when the file is associated with a good package reputation indicating a trusted package and the file reputation does not indicate that the file is a known bad file. The application control component 158 may allow execution of the file when the file reputation indicates that the file is trusted even if the file is not associated with a good package reputation. The application control component 158 may block execution of the file when the file reputation indicates that the file is a known bad file. In an implementation, the application control component 158 may use a decision table 300 to determine whether to allow execution of a file based on a combination of the package reputation and the file reputation. Further details regarding the application control component 158 and decision table 300 are described with respect to FIG. 3.

Figure 2:
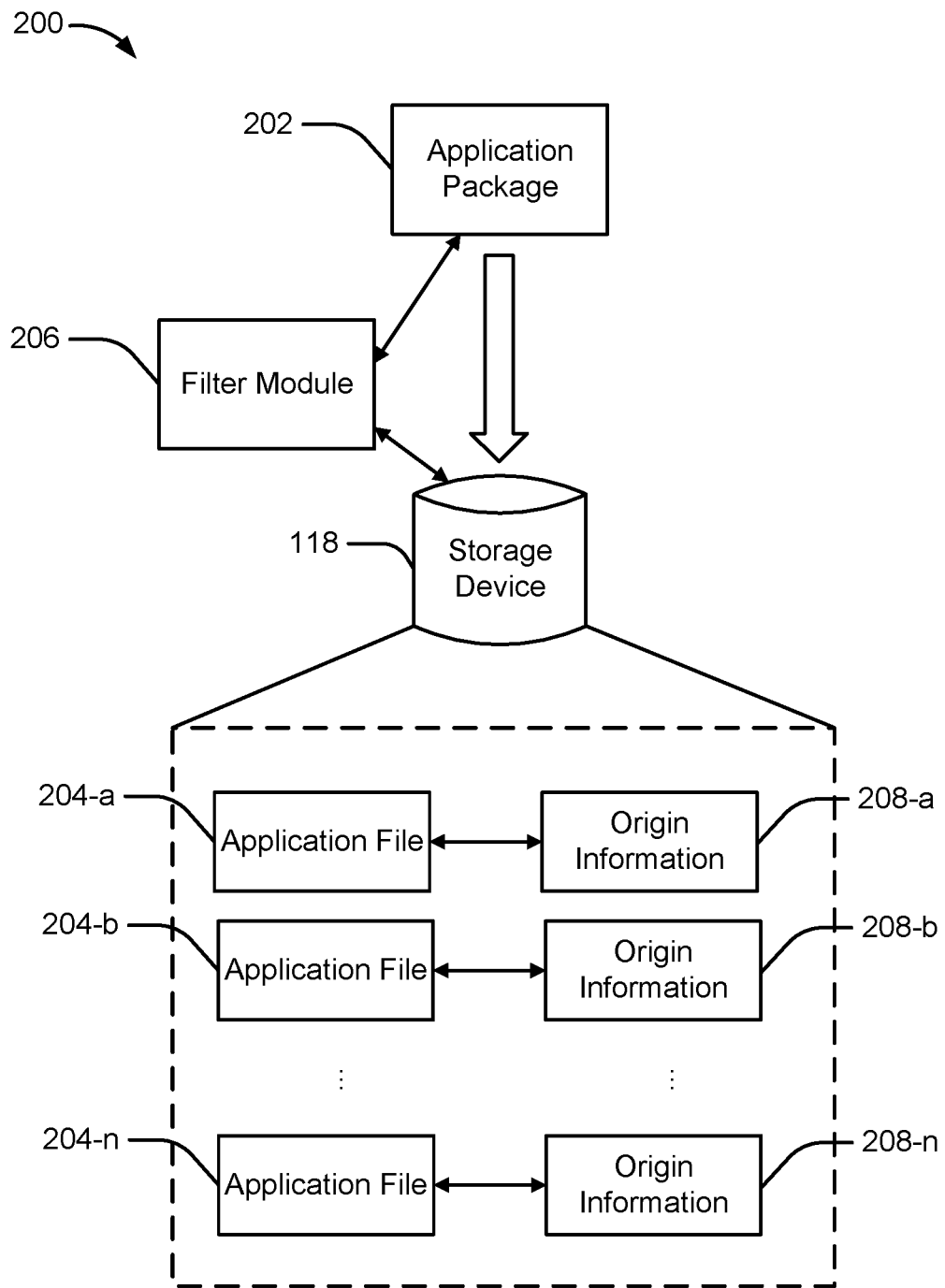
FIG. 2 is conceptual diagram illustrating propagation of a file reputation to individual application files, in accordance with an implementation of the present disclosure.

FIG. 2 illustrates an example of propagating package reputation from an installation package to an installed application file in accordance with one or more implementations. As shown in FIG. 2, an application package 202 is installed on a computer device, which may be the computer device 110 including storage device 118. As part of the installation process, one or more (n) application files 204(*a*), . . . , 204(*n*) are written to the storage device 118 by the application package 202 invoking a filter module 206. The filter module 206 is, for example, a module of an operating system running on the computer device 110. The filter module 206 manages writing of data to the storage device 118 and reading of data from the storage device 118 for various executable files on the computer device 110. For each application file 204 written to the storage device 118, the filter module 206 writes to the storage device 118 origin information for the application package 202 as metadata associated with the application file 204. This metadata is illustrated as metadata 208(*a*), . . . , 208(*n*) in FIG. 2. The metadata 208 can be maintained in a variety of different manners. In one or more embodiments, for computer devices running certain of the Windows® family of operating systems, the metadata 208 is written as extended attributes in an Alternate Data Stream (ADS).

It should be noted that although origin information is illustrated as being written to the storage device 118 as metadata for each of the application files 204 written to the storage device, as discussed above in some situations origin information for an application file is not written to the storage device 118. For example, if an application file 204 is a data file and is not an executable file, origin information for that application file 204 may not be written to the storage device 118.

Figure 3:
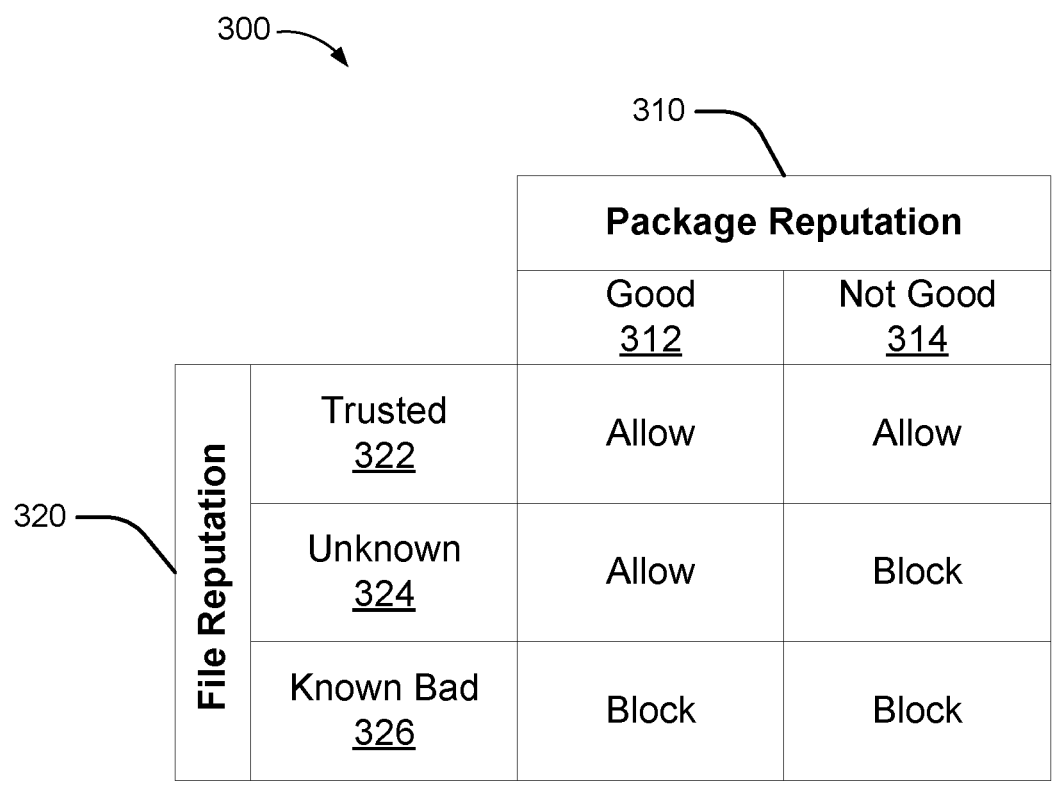
FIG. 3 is a conceptual diagram of an example decision table for determining whether to allow execution of application files based on a combination of package reputation and file reputation, in accordance with an implementation of the present disclosure.

Turning to FIG. 3, an example decision table 300 may be implemented by the application control component 158. The decision table 300 may receive a package reputation 310 and a file reputation 320. The package reputation 310 may have a value of good 312 or a value of not good 314. The file reputation may have a value of trusted 322, unknown 324, or known bad 326. The decision table 300 may allow execution of an executable file if the package reputation 310 has a value of good 312 and the file reputation 320 has a value of trusted 322. The decision table 300 may allow execution of an executable file if the package reputation 310 has a value of not good 314 and the file reputation 320 has a value of trusted 322. The decision table 300 may allow execution of an executable file if the package reputation 310 has a value of good 312 and the file reputation 320 has a value of unknown 324. The decision table 300 may block execution of an executable file if the package reputation 310 has a value of not good 314 and the file reputation 320 has a value of unknown 324. The decision table 300 may block execution of an executable file if the package reputation 310 has a value of good 312 and the file reputation 320 has a value of known bad 326. The decision table 300 may allow execution of an executable file if the package reputation 310 has a value of not good 314 and the file reputation 320 has a value of known bad 326.

Figure 4:
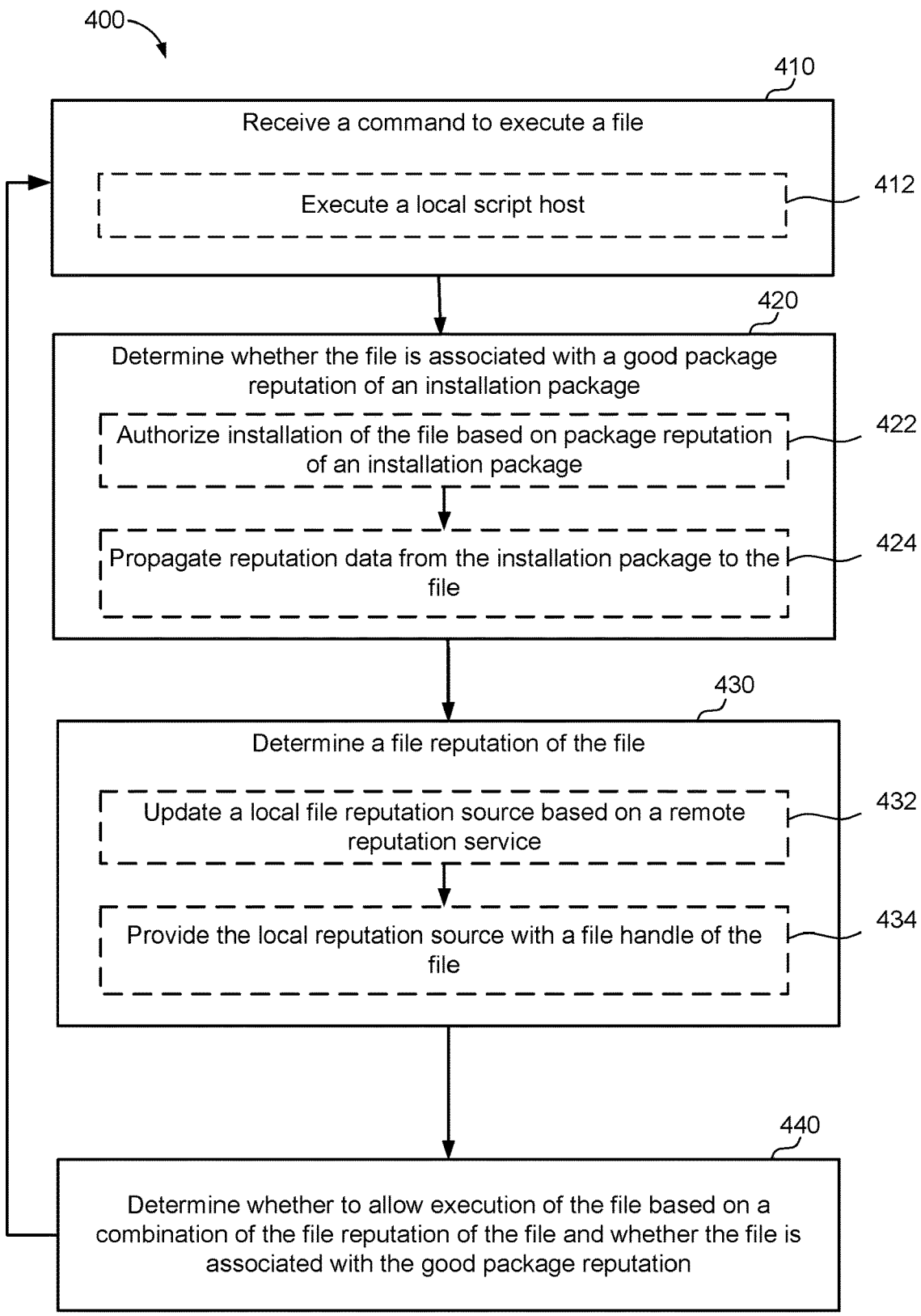
FIG. 4 is a flowchart of an example method of determining whether to allow execution of application files, in accordance with an implementation of the present disclosure.

Turning to FIG. 4, an example method 400 determines whether to allow execution of an executable file. For example, method 400 may be performed by the security component 150 of the operating system 140 on the computer device 110.

At 410, the method 400 may include receiving a command to execute a file. For instance, execution shell 152 may receive a command to execute a file. For example, the execution shell may receive a user command such as double-clicking an icon, selecting a run command from a menu, or entering a command on a command-line. The execution shell 152 may also receive commands from executing files to execute another file. For example, an executing file may generate a command to execute another file or request dynamic linking to a DLL file. In any case, the execution shell 152 may determine that a command to execute a file has been received before the file is executed. In an implementation, at 712, the execution shell may execute a local script host. The local script host may be a series of commands for checking the reputation of the file before executing the file.

At 420, the method 400 may include determining whether the file is associated with a good package reputation of an installation package. For instance, the package reputation component 154 may determine whether the file is associated with a good package reputation of an installation package. For example, if the file was not installed via an installation package (e.g., the file was independently downloaded), the file may not be associated with a good package reputation. The package reputation component 154 may assign a default package reputation of "not good" to files that are not associated with a package reputation. If the file was installed via an installation package, the file may be associated with metadata 208 indicating the package reputation, which may be good or not good based on the reputation of the installation package. The package reputation component 154 may determine the package reputation of the file to be executed based on the metadata 208.

At 422, the method 400 may include authorizing installation of the file based on package reputation of an installation package. For example, the package reputation component 154 may determine the package reputation of the installation package by communicating with the package reputation service 160 via the network interface 126. If the package reputation is "good" or unknown and approved by a user, the package installer 155 may be authorized to install the package, which may include installing the file. At 424, the method 400 may include propagating reputation data from the installation package to the file. For instance, the package installer 155 may propagate the reputation data from the application package 202 to metadata 208 stored in association with the file in the storage device 118.

At 430, the method 400 may include determining a file reputation of the file. For example, the file reputation component 156 may determine the file reputation of the file. In an implementation, the file reputation component 156 may determine the file reputation based on a local reputation source such as the reputation list 157. The reputation list 157 may store a file reputation of files commonly executed on the computer device 110. The reputation list 157 may also include file reputations of other common files, for example, based on execution statistics reported to the file reputation service 162. At 432, the method 400 may include updating a local file reputation source based on a remote reputation source. For instance, the file reputation component 156 may update the reputation list 157 based on the file reputation service 162. In an implementation, the file reputation component 156 may periodically or opportunistically download updated file reputations, for example, whenever a network connection is established. At 434, the method 400 may include providing the local reputation source with a file handle of the file. For instance, the file reputation component 156 may open the file and pass a file handle of the file to the local reputation source. The local reputation source may include logic or executable instructions for determining the reputation of the file. In an implementation, the local reputation source may be an anti-virus application that uniquely identifies the file and determines the reputation of the unique identity.

At 440, the method 700 may include determining whether to allow execution of the file based on a combination of the file reputation of the file and whether the file is associated with the good package reputation. For instance, the application control component 158 may determine whether to allow execution of the file based on the combination of the file reputation of the file and whether the file is associated with the good package reputation. In an implementation, the application control component 158 may use the decision table 300 to determine whether to allow execution of the file.

Figure 5:
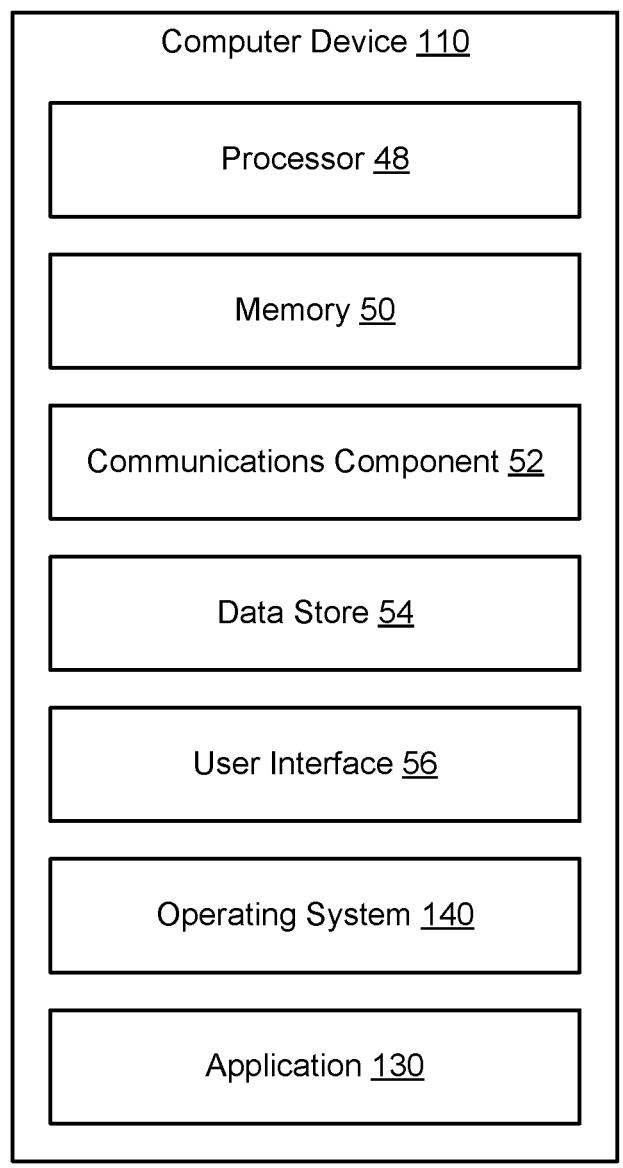
FIG. 5 is a schematic block diagram of an example computer device, in accordance with an implementation of the present disclosure.

Referring now to FIG. 5, illustrated is an example computer device 110 in accordance with an implementation, including additional component details as compared to FIG. 1. In one example, computer device 110 may include processor 48 for carrying out processing functions associated with one or more of components and functions described herein. Processor 48 can include a single or multiple set of processors or multi-core processors. Moreover, processor 48 can be implemented as an integrated processing system and/or a distributed processing system. In an implementation, for example, processor 48 may include CPU 114.

In an example, computer device 110 may include memory 50 for storing instructions executable by the processor 48 for carrying out the functions described herein. In an implementation, for example, memory 50 may include memory 116.

Further, computer device 110 may include a communications component 52 that provides for establishing and maintaining communications with one or more parties utilizing hardware, software, and services as described herein. Communications component 52 may carry communications between components on computer device 110, as well as between computer device 110 and external devices, such as devices located across a communications network and/or devices serially or locally connected to computer device 110. For example, communications component 52 may include one or more buses, and may further include transmit chain components and receive chain components associated with a transmitter and receiver, respectively, operable for interfacing with external devices.

Additionally, computer device 110 may include a data store 54, which can be any suitable combination of hardware and/or software, that provides for mass storage of information, databases, and programs employed in connection with implementations described herein. For example, data store 54 may be a data repository for operating system 140 and/or applications 130. The data store may include memory 116 and/or storage device 118.

Computer device 110 may also include a user interface component 56 operable to receive inputs from a user of computer device 110 and further operable to generate outputs for presentation to the user. User interface component 56 may include one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, user interface component 56 may include one or more output devices, including but not limited to a display, a speaker, a haptic feedback mechanism, a printer, any other mechanism capable of presenting an output to a user, or any combination thereof.

In an implementation, user interface component 56 may transmit and/or receive messages corresponding to the operation of operating system 140 and/or application 130. In addition, processor 48 may execute operating system 140 and/or application 130, and memory 50 or data store 54 may store them.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or procedure described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or procedure may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A computer device for authorizing execution of software, comprising:
   a memory; and
   at least one processor communicatively coupled to the memory, configured to:
      receive a command to execute a file on the at least one processor;
      determine whether the file is associated with a good package reputation of an installation package that installed the file, the package reputation being indicated by a package reputation service;
      determine a file reputation of the file as one of a known good file, a known bad file, or an unknown file as indicated by a file reputation service;
      determine to allow execution of the file based on:
         a determination that the file is associated with the good package reputation indicating a trusted package and
         a determination that the file reputation is an unknown file as indicated by the file reputation service; and
      execute the file on the at least one processor in response to the determination to allow execution of the file.

2. The computer device of claim 1, wherein the processor is configured to allow execution of the file on a determination that the file reputation indicates that the file is trusted even if the file is not associated with the good package reputation.

3. The computer device of claim 1, wherein the processor is configured to block execution of the file on a determination that the file reputation indicates that the file is a known bad file as indicated by a file reputation service.

4. The computer device of claim 1, wherein the processor is configured to block execution of the file on a determination that the file reputation indicates that a reputation of the file is unknown and the file is not associated with the good package reputation.

5. The computer device of claim 1, wherein the processor is configured to determine whether the file is associated with the good package reputation of the installation package based on reputation data propagated from the installation package to the file.

6. The computer device of claim 1, wherein the processor is configured to associate the good package reputation with the file when the file is installed by the installation package.

7. The computer device of claim 1, wherein the processor is configured to determine the file reputation of the file based on a local file reputation source.

8. The computer device of claim 7, wherein the processor is configured to provide the local file reputation source with a file handle of the file.

9. The computer device of claim 7, wherein the local file reputation source is updated based on a remote file reputation service.

10. The computer device of claim 1, wherein the file is an updated file received after installation of the installation package.

11. The computer device of claim 1, wherein the processor is configured to receive the command to execute the file using a local script host.

12. A method for authorizing execution of software on at least one computer processor, comprising:
   receiving a command to execute a file on the at least one computer processor;

determining whether the file is associated with a good package reputation of an installation package that installed the file, the package reputation being indicated by a package reputation service;

determining a file reputation of the file as one of a known good file, a known bad file, or an unknown file as indicated by a file reputation service;

determining to allow execution of the file based on:
- a determination that the file is associated with the good package reputation indicating a trusted package and
- a determination that the file reputation is an unknown file as indicated by file reputation service; and executing the file on the at least one computer processor in response to the determination to allow execution of the file.

13. The method of claim 12, wherein determining whether to allow execution of the file includes allowing execution of the file in response to a determination that the file reputation indicates that the file is trusted even if the file is not associated with a good package reputation.

14. The method of claim 12, wherein determining whether to allow execution of the file includes blocking execution of the file in response to a determination that the file reputation indicates that the file is a known bad file as indicated by a file reputation service.

15. The method of claim 12, wherein determining whether to allow execution of the file includes blocking execution of the file in response to a determination that the file reputation indicates that a reputation of the file is unknown and the file is not associated with a good package reputation.

16. The method of claim 12, further comprising:
authorizing installation of the file based on the good package reputation of the installation package; and
propagating reputation data from the installation package to the file.

17. The method of claim 12, wherein determining the file reputation of the file includes:
updating a local file reputation source based on a remote reputation service; and
providing the local file reputation source with a file handle of the file.

18. A non-transitory computer-readable medium, comprising code executable by one or more processors for determining whether to allow execution of an application file on a computer device, the code comprising code for:
receiving a command to execute a file on at least one processor of the computer device;
determining whether the file is associated with a good package reputation of an installation package that installed the file, the package reputation being indicated by a package reputation service;
determining a file reputation of the file as one of a known good file, a known bad file, or an unknown file as indicated by a file reputation service;
determining to allow execution of the file based on;
a determination that the file is associated with the good package reputation indicating a trusted package and
a determination that the file reputation is an unknown file as indicated by the file reputation service; and
executing the file on the at least one processor in response to a determination to allow execution of the file.

* * * * *